June 9, 1925.
F. D. WINKLEY
LUBRICATING COUPLING
Filed Jan. 2, 1920
1,541,409
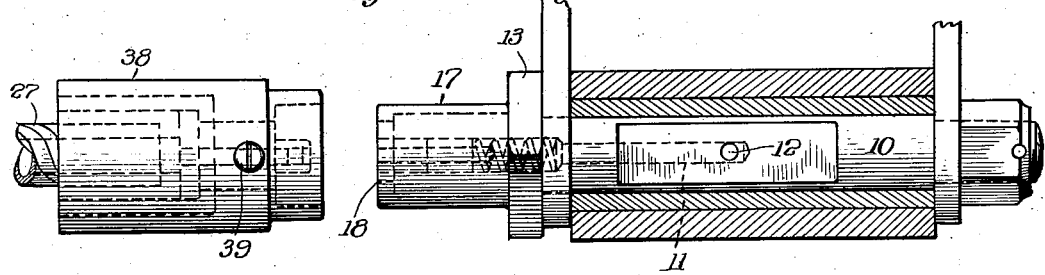
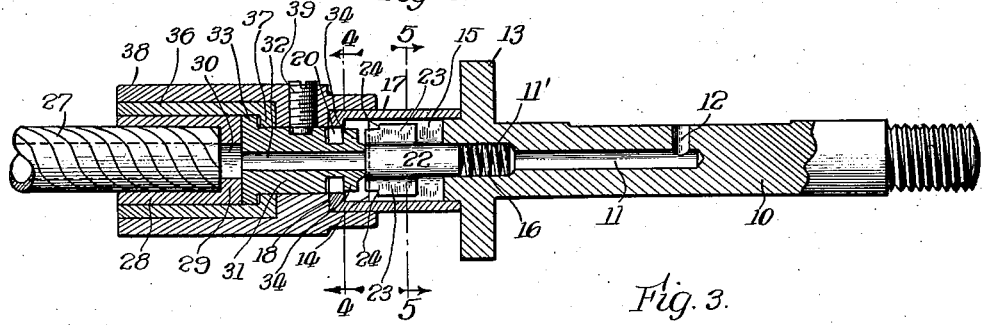
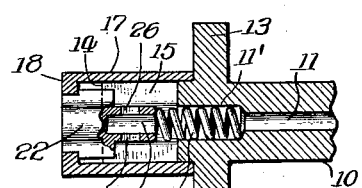
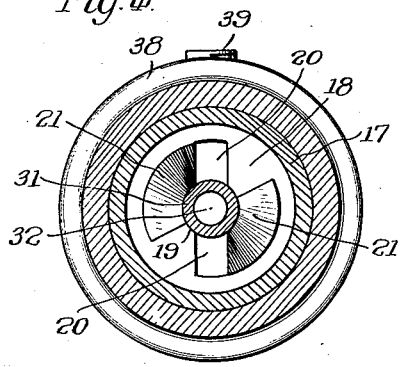
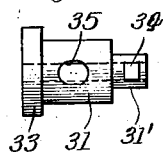
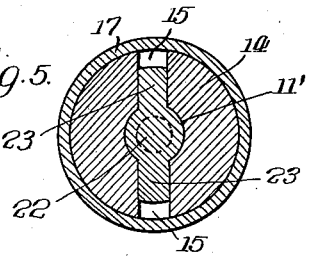
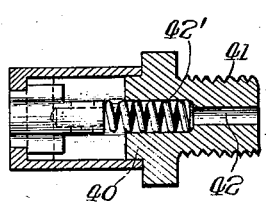
Witness:
A. J. Sauser.
Inventor:
Frank D. Winkley,
By Pond & Wilson,
Attys.

Patented June 9, 1925.

1,541,409

UNITED STATES PATENT OFFICE.

FRANK D. WINKLEY, OF MADISON, WISCONSIN, ASSIGNOR TO THE BASSICK MANUFACTURING COMPANY, OF CHICAGO, ILLINOIS, A CORPORATION OF DELAWARE.

LUBRICATING COUPLING.

Application filed January 2, 1920. Serial No. 348,924.

*To all whom it may concern:*

Be it known that I, FRANK D. WINKLEY, a citizen of the United States, residing at Madison, in the county of Dane and State of Wisconsin, have invented certain new and useful Improvements in Lubricating Couplings, of which the following is a specification.

This invention relates in general to lubricating systems and has reference more particularly to an improved coupling for lubricating with oil the various minor bearings, such as the spring-bolts, brake-operating mechanism, steering mechanism, etc., of a motor car, and is of the same general type as the lubricating system disclosed in my re-issued Letters Patent, No. 14,667, dated June 10, 1919, but embodies certain important improvements thereon.

The problem of lubricating the spring-bolts, knuckle-joints of the steering gear, and other small bearing surfaces of motor cars in a manner that will insure satisfactory service and longevity of the parts has been the subject of much study by many engineers who have been engaged in the automobile industry; but so far, to the best of my knowledge and belief, no entirely satisfactory solution has been reached. The system disclosed in my former patent above identified presents, I believe, a distinct improvement on the old grease-cup system of lubrication, but presents some difficulties in its practical and commercial use since it is expensive to manufacture and somewhat difficult to clean free from dust, mud and other foreign matter, which is very necessary before a new charge of lubricant can be introduced, in order to avoid injury from the introduction of grit and other foreign matter. In a pressure feed system, the receiver, which is that part of the bearing to which the grease gun is attached and through which the lubricant passes on its way to the bearing surfaces, from the nature of its structure and functions is likely to be covered with lubricant that will cause it to accumulate road dust of all descriptions, and, at times, be thickly coated with very adhesive mud that must be removed before a new charge of lubricant can be introduced; and unless this is easy to do, with no danger of forcing any of it into the bearing, it is likely to be neglected. If the construction is such that in the process of cleaning and removing the mud and dust accumulations, some of the dirt is likely to be forced into the receiver past the valves that are intended to exclude such material, such a device is seriously objectionable, since when such dirt has once found entrance the lubricant under pressure will carry it along until it has reached the bearing surfaces where it may do serious damage.

The principal object of the present invention is to obviate the above noted objections, and the device herein shown and described as embodying a practical and approved form of the invention is such that the removal of any form of accumulations can be accomplished easily, quickly, and by any kind of wiping materials with absolute certainty, since the entire surface of the receiver to which the charging nozzle is applied is smooth and free from any projections, grooves, depressions or other surface irregularities, and the valve in the receiver is of such a structure and character that there is no possible danger of any dirt passing by it, so that the user can always feel certain that there is no grit on its way to the highly finished wearing surfaces it is desired to protect.

My invention, its manner of use, and advantages will be readily understood and appreciated by those skilled in the art from the following detailed description of the practical embodiment thereof shown in the accompanying drawings, in which—

Fig. 1 is a plan view of the parts comprising my improved lubricating system, the nozzle being shown separated from the oil receiver;

Fig. 2 is a view of the same parts in axial longitudinal section, and with the nozzle engaged with the receiver;

Fig. 3 is an axial longitudinal view of the receiver, showing its valve in closed position and also showing the oil passages provided in the valve stem;

Figs. 4 and 5 are enlarged cross-sections taken on the lines 4—4 and 5—5, respectively, of Fig. 2;

Fig. 6 is a detail in side elevation of that member of the nozzle which opens the receiver valve and locks the nozzle with an oil-tight joint on the receiver; and Fig. 7 is a view in axial longitudinal section of an independent receiver by the use of which any bearing can be equipped for lubrication in accordance with the present invention.

Referring to the drawings, 10 designates a part to be lubricated, in this instance a spring shackle bolt provided with longitudinal and transverse ducts 11 and 12 to lead the oil to the outer surface of the bolt to be lubricated. Beyond the head 13 of the bolt is an integral extension 14 having a longitudinal axial slot 15 extending from its outer end to within a short distance of the outer face of the head 13. The outer portion of the duct 11 is enlarged, as shown at 11', forming a chamber for a coil spring 16, this enlarged portion 11' of the duct being continued through the extension 14.

Secured on and tightly fitted to the bolt extension 14 is a cap 17 having a smooth, flat outer end wall 18 in which is an opening of the form shown in Fig. 4 and comprising a central circular portion 19 and opposite radially extending portions 20. On the inner surface of the end wall 18 and lying opposite one side of each of the openings or slots 20 are a pair of low spiral cams 21 (Fig. 4) for a purpose hereinafter explained.

Fitted to slide within the bore 11' and slot 15 of the bolt extension is a valve comprising a central circular body or stem portion 22 occupying the bore 11' and opposed wings 23 occupying the slot 15. It will be observed that the combined radial width of these wings 23 is less than the full radial width of the slot 15, thereby providing spaces for the flow of oil past the outer edges of the wings; and it will also be noted that the forward corners of the wings are rectangularly cut away or notched to thereby give the forward or outer end of the valve a contour and size that will exactly fill the opening in the end wall of the cap, as shown in Fig. 3. This notching of the forward corners of the valve forms abutment shoulders 24 which serve as stops to limit the closing movement of the valve at a point where the outer end of the valve is just flush with the outer surface of the end wall 18 of the cap, as shown in Fig. 3; the forward end of the valve at this time completely filling the opening in said end wall 18. The valve stem is formed with a longitudinal duct 25 (Fig. 3) open at its inner or rear end and communicating with the slot 15 by a pair of lateral ports 26.

27 designates a flexible oil conduit which is connected at one end to any suitable oil forcing device such as that shown in Fig. 1 of my former patent above referred to. To the other end of this conduit 27 is secured the charging nozzle, comprising, as herein shown, the following parts. To the conduit tube 27 is soldered a sleeve 28 having an end wall 29 that lies against the end of tube 27 and is provided with a hole 30 registering with the bore of tube 27. Abutting against the end wall 29 is the valve-opening and nozzle-locking member 31 shown in isolated detail in Fig. 6. The member 31 has an axial oil duct 32 and an annular flange 33 at its rear end. Its forward end is reduced in diameter, as shown at 31' to a size which permits it to pass through the central portion 19 of the opening in the end wall 18 of the cap 17, and this reduced portion 31' is provided with a pair of oppositely disposed radial wings 34 of a size to pass through the portions 20 of the opening in the end wall; these wings 34 cooperating with the spiral cams 21 in a manner to be described. In the top of the member 31 is a shallow hole 35 of slightly oval form with its major axis extending lengthwise of the nozzle member 31. Over the members 31 and 28 is slipped a locking sleeve 36 that is soldered to the sleeve 28 and is formed with an internal flange 37 that cooperates with the flange 33 of member 31 to lock the latter rotatably to the sleeve 28; a slight amount of play being allowed between the two flanges to insure the locking of the nozzle on the receiver with an oil-tight joint. Surrounding the members 31 and 36 is a handle sleeve 38 that is locked to the member 31 by a screw 39, the inner end of which enters the hole 35 in the member 31, so that rotary movement of the handle is transmitted to the member 31. The internal diameter of the forward end of the handle sleeve 38 is such that it will have a sliding fit on the outer end of the receiver cap 17, as clearly shown in Fig. 2.

Briefly describing the operation of the device, in the normal condition of the oil receiver shown in Figs. 1 and 3 the valve is closed under the thrust of spring 16, the opening in the end wall of the cap 17 being completely filled by the forward portion of the valve, and the front end of the latter lying flush with the outer surface of the end wall 18 of the cap so that the receiver presents nothing but smooth surfaces free from projections, depressions and any irregularities of surface which tend to collect and hold mud, dust, and the like, which surfaces are easily wiped clean by an ordinary cloth wiper or any other cleaning device. When lubricant is to be applied, the nozzle is pressed into endwise engagement with the receiver, the forward end of the handle sleeve telescoping over the forward end of the receiver cap, and the forward end of the nozzle 31 passing through the opening in the front wall of the cap and unseating the valve; the parts then occupying the relative positions shown in Fig. 2. The handle sleeve is then given a partial turn in a contra-clockwise direction viewing Fig. 4, which causes the wings 34 to wipe over the cams 21, thereby drawing the handle sleeve into snug, oil-tight engagement with the receiver cap. This action is permitted by the slight lost motion or play between the flanges 33 and 37 and between the screw 39 and the hole 35. The lubricant is then forced in, pushing back and flowing around the valve in the slot 15, flowing thence through the ports 26 into the duct 25, and from the latter through the ducts 11', 11 and 12 to the surfaces to be oiled. When sufficient lubricant has been applied, the handle sleeve is turned back to its former position, and the nozzle withdrawn; the valve immediately returning to the closed position shown in Fig. 3.

In Fig. 7 I have illustrated a form of the invention which includes an independent receiver, adapting the system to application to any member to be oiled that is provided with a tapped hole to which the receiver may be coupled. This independent receiver is structurally identical with the receiver already described, except that the part 40 to which the receiver cap is applied, instead of being an integral part of the bearing member to be lubricated, is an independent member formed with a threaded stem or shank 41 and with the axial bore 42 and 42'; the stem 41 being capable of being coupled on to any bearing member that has a tapped hole to receive it.

It is believed that the invention, its mode of use, and advantages will be readily apprehended from the foregoing description, in the light of the accompanying drawings. It will be noted as constituting one of the leading advantages of the invention that upon the removal of the charging terminal the valve instantly returns to its normal closed position as shown in Fig. 3, effectually closing the receiver against the entrance of any foreign matter, and presenting a uniform smooth surface easily cleaned of any accumulations.

Manifestly minor changes in details of structure and arrangement may be made without departing from the principle of the invention or sacrificing any of the advantages thereof. Hence, I reserve all such variations and modifications as fall within the spirit and purview of the appended claims.

I claim:—

1. In a lubricating coupling, the combination of an oil receiver having an end wall formed with an opening, a valve in said receiver normally completely filling said opening, an oil delivery nozzle formed with a central valve-displacing member slidably engageable with said opening and adapted to open said valve, a cam on the inner side of said end wall, and a radial projection on the forward end of said valve-displacing member adapted to cooperate with said cam under a turning movement of said nozzle to draw the latter into oil-tight contact with said receiver.

2. In a lubricating coupling, the combination of an oil receiver having an end wall formed with an opening, a valve in said receiver normally completely filling said opening, an oil delivery nozzle formed with a central valve-displacing member slidably engageable with said opening and adapted to open said valve, a handle sleeve keyed to said nozzle and having its forward end projecting beyond the forward end of the latter and adapted to telescope over said receiver, and cooperating means on said receiver and valve-displacing member for effecting an oil-tight joint of said handle sleeve and nozzle on said receiver under a rotary movement of said handle sleeve.

3. In a lubricating coupling, the combination of an oil receiver having an end wall formed with an opening, a spring-pressed valve in said receiver normally completely filling said opening, an oil delivery nozzle formed with a central valve-displacing member slidably engageable with said opening and adapted to open said valve, a pair of spiral cams on the inner side of said end wall, a pair of radial projections on the forward end of said valve-displacing member adapted to wipe over said cams under a turning movement of said nozzle, and a handle sleeve keyed to said nozzle and having its forward end projecting beyond the latter and adapted to telescope over said receiver.

FRANK D. WINKLEY.